(12) United States Patent
Han

(10) Patent No.: US 10,551,549 B2
(45) Date of Patent: Feb. 4, 2020

(54) CONDENSING SHEET, BACKLIGHT UNIT AND LIQUID CRYSTAL DISPLAY DEVICE USING THE SAME

(71) Applicant: LG Display Co., Ltd., Seoul (KR)

(72) Inventor: Young-Bae Han, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 35 days.

(21) Appl. No.: 14/135,060

(22) Filed: Dec. 19, 2013

(65) Prior Publication Data

US 2014/0320783 A1    Oct. 30, 2014

(30) Foreign Application Priority Data

Apr. 30, 2013  (KR) .................. 10-2013-0048719
Aug. 9, 2013  (KR) .................. 10-2013-0094988

(51) Int. Cl.
*G02B 5/04*   (2006.01)
*G02F 1/1335*  (2006.01)
*F21V 8/00*   (2006.01)

(52) U.S. Cl.
CPC ..... *G02B 6/0053* (2013.01); *G02F 1/133615* (2013.01); *G02F 2001/133607* (2013.01)

(58) Field of Classification Search
CPC ... G02F 1/133615; G02F 2001/133607; G02B 6/005; G02B 6/0018; G02B 6/0053
See application file for complete search history.

(56) References Cited

U.S. PATENT DOCUMENTS

| 7,056,005 | B2 * | 6/2006 | Lee | G02B 6/0036 |
| | | | | 362/23.15 |
| 7,387,422 | B2 * | 6/2008 | Won | G02B 6/0036 |
| | | | | 362/619 |
| 7,688,511 | B2 * | 3/2010 | Komatsu et al. | 359/566 |
| 7,988,340 | B2 * | 8/2011 | Kuo | 362/331 |
| 8,885,995 | B2 * | 11/2014 | Morgan | 385/33 |
| 9,134,471 | B2 * | 9/2015 | Johnston et al. | |
| 2007/0076435 | A1 * | 4/2007 | Chang | G02B 6/0038 |
| | | | | 362/626 |
| 2010/0278480 | A1 * | 11/2010 | Vasylyev | G02B 3/005 |
| | | | | 385/33 |
| 2012/0140352 | A1 | 6/2012 | Morgan | |

FOREIGN PATENT DOCUMENTS

| CN | 1989431 A | 6/2007 |
| CN | 101512398 A | 8/2009 |
| JP | 05-333334 A | 12/1993 |
| JP | 11-142622 A | 5/1999 |
| JP | 2007-249220 A | 9/2007 |
| TW | 201009398 A | 3/2010 |

* cited by examiner

Primary Examiner — Dung T Nguyen
(74) Attorney, Agent, or Firm — Dentons US LLP

(57) ABSTRACT

A condensing sheet, a backlight unit and a liquid crystal display device using the same are disclosed. The condensing sheet includes a base film, and a plurality of condensation patterns formed on the base film, wherein a first area and a second area are alternately defined on an upper surface of the base film, at least two condensation patterns are arranged in the first area, and a flat surface is formed in the second area, and wherein a width of each of the condensation patterns may be greater than a width of the flat surface.

16 Claims, 13 Drawing Sheets

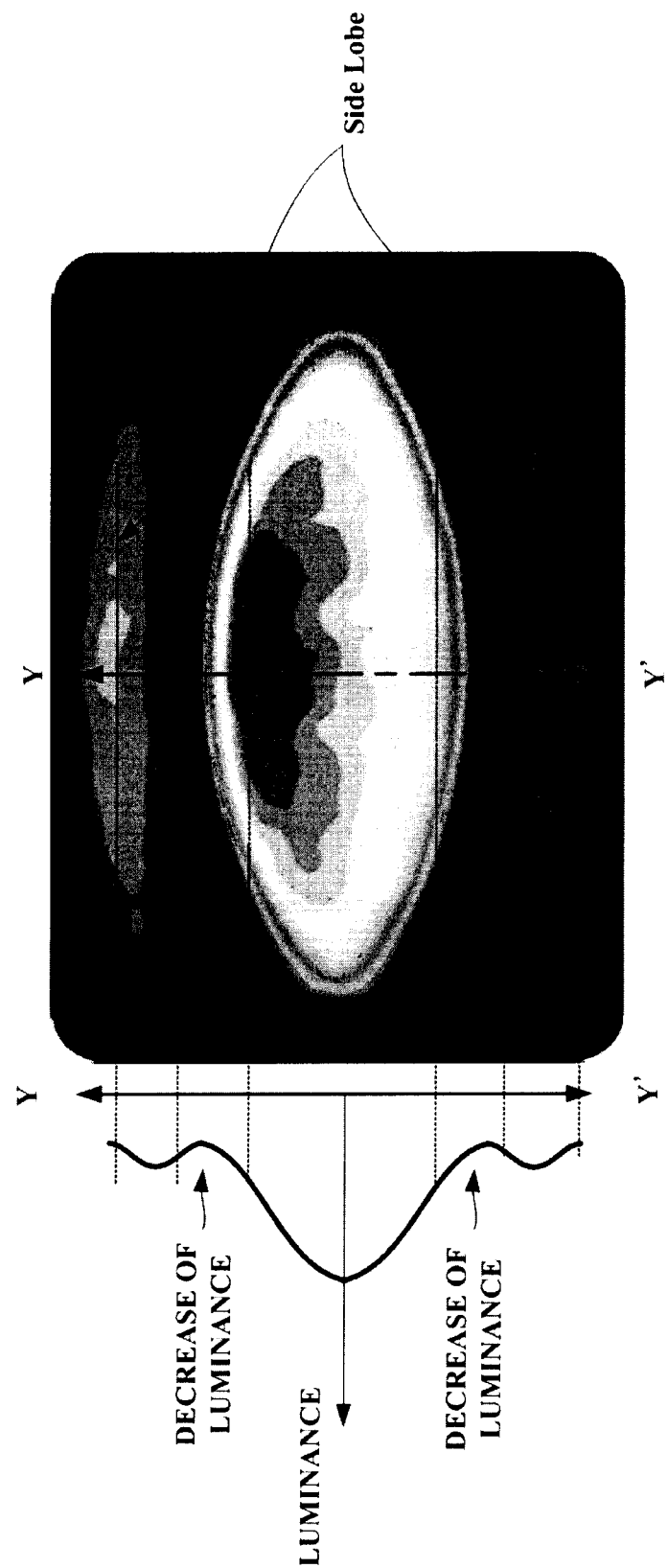

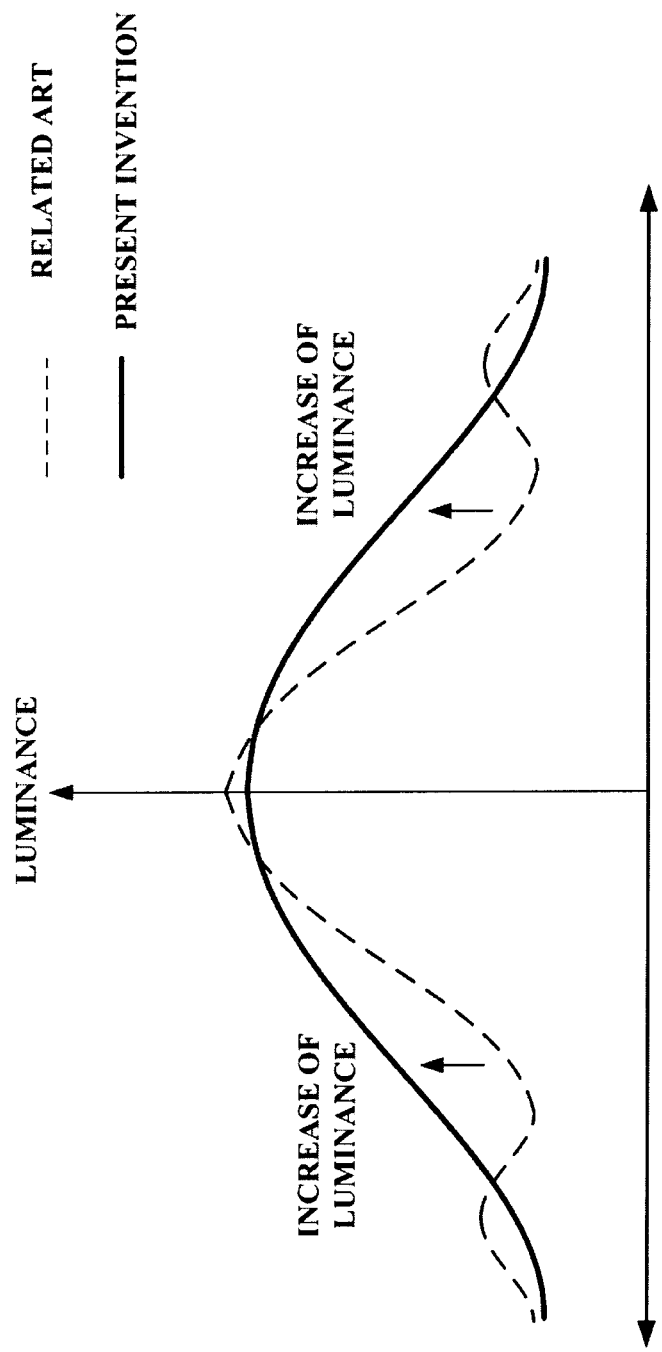

Area A+: +/- 10°, +8°/-4°, Area A: +/-40°, +20°/-10°, Area B: +/-50°, +20°/-10°

CASE 2

| Sheet | d2=25μm, d3=5μm, Angle 92° prism pattern 30ea | |
|---|---|---|
| ELDIM Image | | |
| CR (4 point avg.) | Center | 995: 1 (11.4% ↑) |
| | A+ | 981: 1 (12.4% ↑) |
| | A | 654: 1 (11.0% ↑) |
| | B | 552: 1 (12.4% ↑) |

Area A+: +/- 10°, +8°/-4°, Area A: +/-40°, +20°/-10°, Area B: +/-50°, +20°/-10°

CONDENSING SHEET, BACKLIGHT UNIT AND LIQUID CRYSTAL DISPLAY DEVICE USING THE SAME

CROSS REFERENCE TO RELATED APPLICATIONS

This application claims the benefit of priority of Korean Patent Application No. 10-2013-0048719, filed on Apr. 30, 2013, and Korean Patent Application No. 10-2013-0094988, filed on Aug. 9, 2013, which are hereby incorporated by reference for all purposes as if fully set forth herein.

BACKGROUND OF THE INVENTION

Field of the Invention

The present invention relates to a condensing sheet, a backlight unit, and liquid crystal display device using the same.

Discussion of the Related Art

In recent years, among the variety of flat panel display devices, liquid crystal display (LCD) devices have been most widely used because of its features of excellent image quality, light weight, slim design, and low power consumption.

A liquid crystal display device displays an image by adjusting light transmissivity of liquid crystals having dielectric anisotropy by using an electric field. To this end, the liquid crystal display device is provided with a liquid crystal panel having liquid crystal cells arranged in the form of a matrix, and a backlight unit to emit light to the liquid crystal panel.

As light sources of the backlight unit, a cold cathode fluorescent lamp (CCFL), an external electrode fluorescent lamp (EEFL), and a light emitting diode (LED) are used. Backlight units may be classified into edge-type backlight units and direct-type backlight units according to the position of the light source. Edge-type backlight units are configured such that a light guide plate is disposed at the lower portion of the liquid crystal panel and a light source is disposed at one lateral surface of the liquid crystal panel. Direct-type backlight units are configured such that a diffusion plate is disposed at the lower portion of the liquid crystal panel and a light source is disposed at the lower portion of the liquid crystal panel.

As disclosed above, a backlight unit is provided with a plurality of optical sheets at the upper portion of a light guide plate or diffusion plate. The optical sheets include at least one diffusion sheet, and at least one condensing sheet.

The diffusion sheet is provided with a base film formed of polyethylene terephthalate (PET), acrylic resin layers formed on both sides of the base film and containing a light-diffusing agent such as bead. The diffusion sheet diffuses incident light to prevent dazzling due to partial concentration of light.

The condensing sheet may be a prism sheet provided with a base film formed of PET, and prisms formed in a pattern on the upper surface of the base film. The condensing sheet allows the incident light to leave the condensing sheet in a direction perpendicular to the liquid crystal panel, thereby increasing luminance per unit area.

For example, as shown in FIG. 1 a condensing sheet 5 implemented as a prism sheet has triangular cross sections in which a first inclined surface 5a and a second inclined surface 5b are alternately repeated. The light incident upon the condensing sheet is divided into perpendicular light L1, which is perpendicularly incident, and inclined light L2, which is incident in an inclined manner.

Specifically, the perpendicular light L1 perpendicularly incident upon the rear surface of the condensing sheet 5 undergoes total reflection on the first and second inclined surfaces 5a and 5b of a prism, and is then recycled. The inclined light L2 incident upon the first and second inclined surfaces 5a and 5b of a prism at a predetermined angle is refracted at the first inclined surface 5a or the second inclined surface 5b of the prism and perpendicularly collected at a liquid crystal panel. When the inclined light L2 is incident, some light L2-1 of the inclined light L2 travels along the first inclined surface 5a or second inclined surface 5b of the prism and leaves the prism without being refracted. This phenomenon is called side lobe.

In the case of the condensing sheet of the related art, side lobes degrade light condensing efficiency of the condensing sheet and lower the luminance of the front of a liquid crystal display device and contrast ratio at the viewing angle. Accordingly, the condensing sheet of the related art needs to be improved.

SUMMARY OF THE INVENTION

Accordingly, embodiments of the present invention are directed to a condensing sheet, a backlight unit, and a liquid crystal display device using the same that obviate one or more problems due to limitations and disadvantages of the related art.

An advantage of the present invention is to provide a condensing sheet, a backlight unit, and liquid crystal display device using the same which may lower the effect of side lobe and increase luminance at the viewing angle, thereby enhancing the contrast ratio at the viewing angle.

Additional advantages, and features of the invention will be set forth in part in the description which follows and in part will become apparent to those having ordinary skill in the art upon examination of the following or may be learned from practice of the invention. The objectives and other advantages of the invention may be realized and attained by any combination of the structures described in the written description and claims hereof as well as the appended drawings.

In one aspect of the present invention, an condensing sheet includes a base film, and a plurality of condensation patterns formed on the base film, wherein a first area and a second area are alternately defined on an upper surface of the base film, at least two condensation patterns being arranged in the first area, and a flat surface being formed in the second area.

In another aspect of the present invention, a backlight unit comprises at least one diffusion sheet; and at least one condensing sheet, wherein the condensing sheet includes: a base film; and a plurality of condensation patterns formed on the base film, wherein a first area and a second area are alternately defined on an upper surface of the base film, at least two condensation patterns being arranged in the first area and a flat surface being formed in the second area, at least one light guide plate; and at least one reflection sheet.

In another aspect of the present invention, a liquid crystal display device comprises: a liquid crystal panel to display an image; and a backlight unit to supply light to the light crystal panel, wherein the backlight unit comprises: at least one diffusion sheet; and at least one condensing sheet, wherein the condensing sheet includes: a base film; and a plurality of condensation patterns formed on the base film, wherein a first area and a second area are alternately defined on an upper surface of the base film, at least two condensation patterns being arranged in the first area and a flat surface is formed in the second area, wherein a width of each of the condensation patterns is greater than a width of the flat surface.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7A is a view illustrating a simulation of the Related Art, FIG. 7C is a graph comparing curves of the luminance of FIGS. 7A and 7B.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer the same or like parts.

Figure 1:
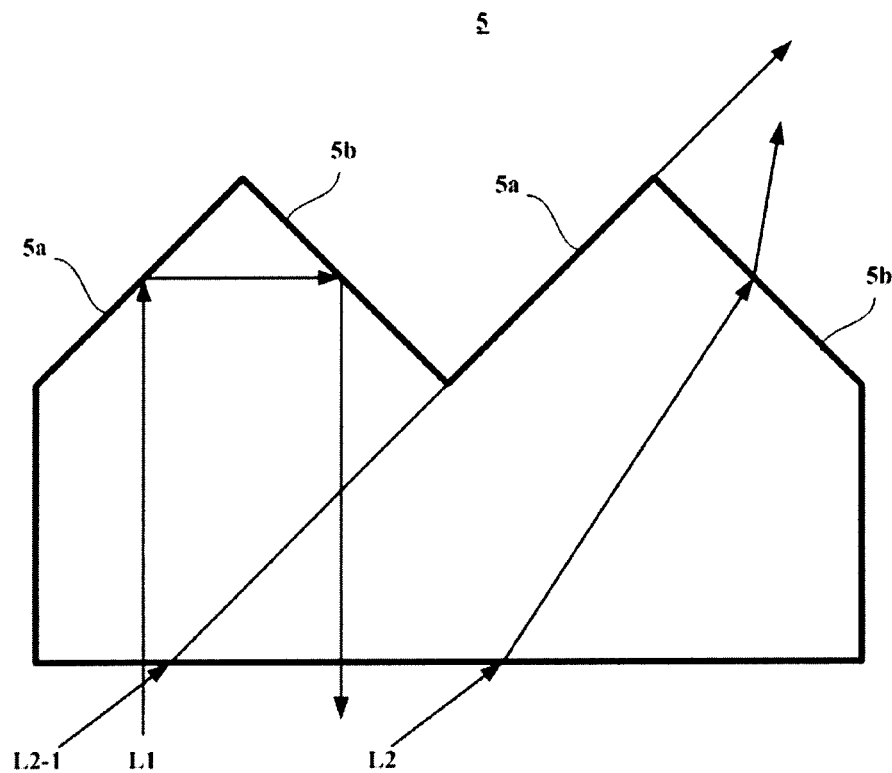
FIG. 1 is a view illustrating the path of light incident on a condensing sheet of the related art.
Figure 2:
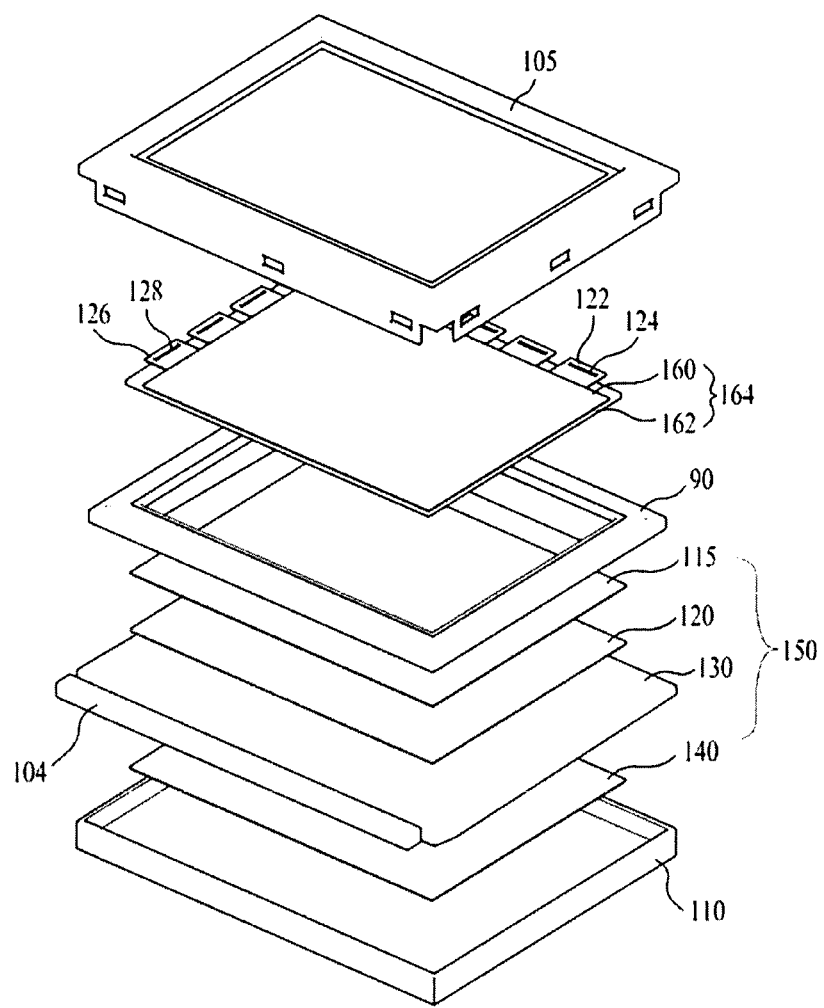
FIG. 2 is an exploded perspective view schematically illustrating a liquid crystal display device including a backlight unit according to one embodiment of the present invention.

FIG. 2 is an exploded perspective view illustrating a liquid crystal display device including a backlight unit according to one embodiment of the present invention.

The liquid crystal display device shown in FIG. 2 includes a liquid crystal panel 164 to display an image, a backlight unit 150 to supply light to the liquid crystal panel 164, and a top case 105 and a bottom case 110 to accommodate the liquid crystal panel 164 and the backlight unit 150.

The backlight unit 150 is provided with a condensing sheet 115 having a condensation pattern 2 and a flat surface 4 alternately formed on a base film 6. Accordingly, side lobes may be suppressed, and luminance at the viewing angle is increased, thereby enhancing the contrast ratio at the viewing angle. The condensing sheet 115 will be described in detail with reference to FIGS. 3 and 7.

The top case 105 is bent to surround the non-display area of the liquid crystal panel 164 and the lateral surface of the bottom case 110. Herein, the top case 105 is fastened and fixed to a panel guide 90 that surrounds the lateral surface of the bottom case 110.

The liquid crystal panel 164 is seated on the panel guide 90 and displays an image by adjusting transmissivity of light from the backlight unit 150 according to an image signal. The liquid crystal panel 164 is provided with a liquid crystal layer (not shown) formed between a lower substrate 162 and an upper substrate 160 and a spacer (not shown) to maintain a constant distance between the lower substrate 162 and the upper substrate 160.

The upper substrate 160 includes color filters, a black matrix and a common electrode. The lower substrate 162 of the liquid crystal panel 164 includes thin film transistors and pixel electrodes connected to the thin film transistors. The common electrode may alternatively be formed on the lower substrate 162 according to modes of liquid crystals.

Provided in a non-display area of the lower substrate 162 are a data pad area connected to the respective data lines (not shown) and a gate pad area connected to the respective gate lines (not shown). Plural data circuit films 122 having a data integrated circuit 124 mounted thereon to supply an image signal to the data lines are attached to the data pad area. Plural gate circuit films 126 having a gate integrated circuit 128 mounted thereon to supply a gate scan signal to the gate lines are attached to the gate pad area. Alternatively, the data integrated circuit 124 and the gate integrated circuit 128 may be directly mounted on the lower substrate 162 using a chip on glass (COG) technique. Alternatively, the gate integrated circuit 128 may be formed on the lower substrate 162 during the fabrication process for the thin film transistors.

The backlight unit 150 includes an edge-type light source 104 to produce light at one side of the liquid crystal panel 164, a light guide plate 130 to convert light emitted from the light source 104 into surface light and to supply the converted light to the liquid crystal panel 164 at the upper portion of the light guide plate 130, a diffusion sheet 120 constructed as a single sheet and positioned at the upper portion of the light guide plate 130 to uniformly diffuse the light, the condensing sheet 115 positioned at the upper portion of the diffusion sheet 120, and a reflective sheet 140 attached to the bottom case 110 to reflect the light directed downward of the liquid crystal panel 164 and to transfer the same to the light guide plate 130.

Although not shown, the backlight unit 150 may include a direct-type light source to produce light at the lower portion of the liquid crystal panel, a diffusion plate disposed at the upper portion of the light source to diffuse light emitted from the light source, a diffusion sheet positioned at the upper portion of the diffusion plate and constructed as a single sheet, a condensing sheet positioned at the upper portion of the diffusion sheet, and a reflective sheet positioned at the lower portion of the light source to reflect the light directed downward from the direct-type light source and transfer the same to the diffusion plate.

As the edge-type light source and the direct-type light source, a cold cathode fluorescent lamp (CCFL), an external electrode fluorescent lamp (EEFL), and a light emitting diode (LED) may be used.

Hereinafter, a detailed description will be given of the condensing sheet 115.

Figure 3:
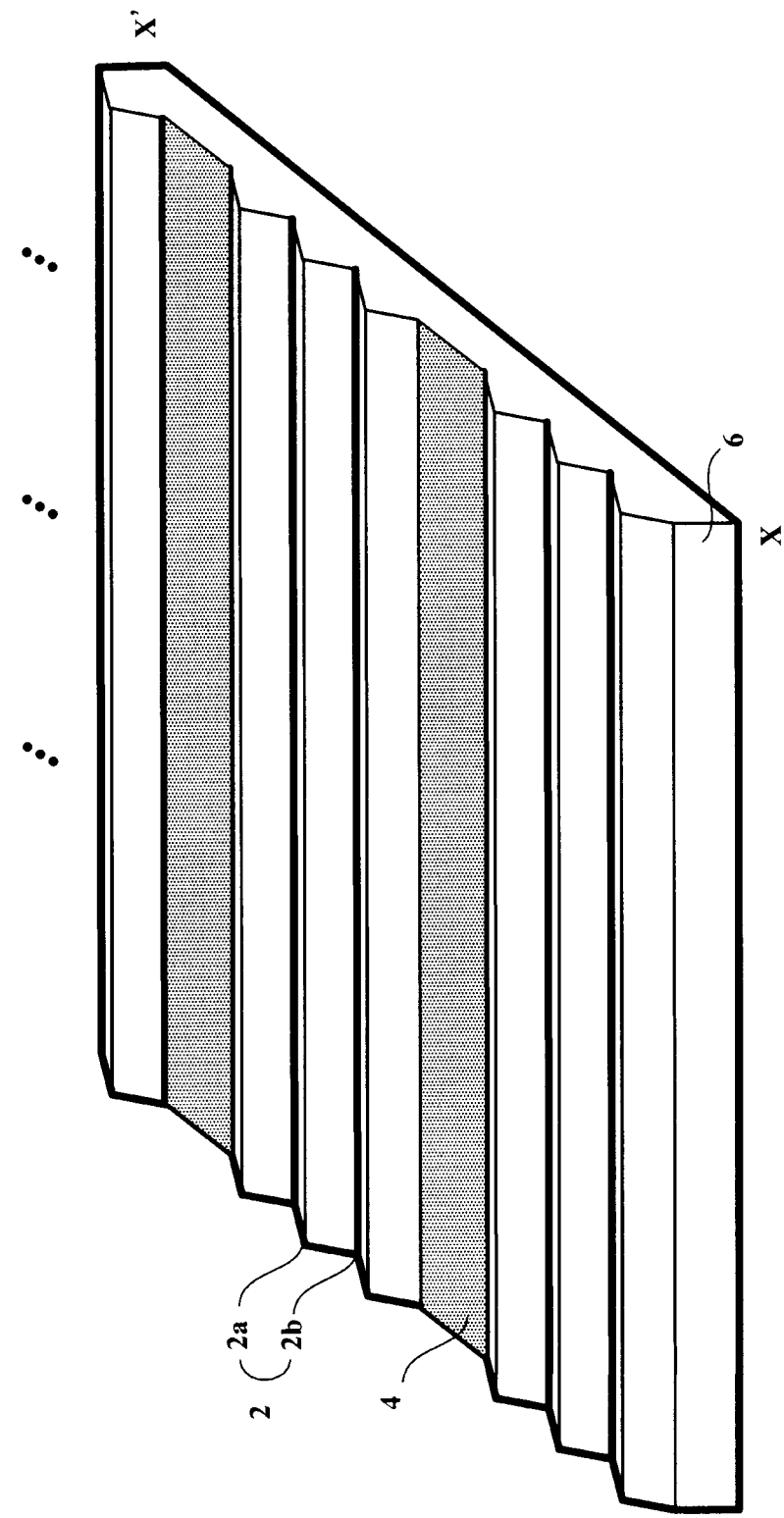
FIG. 3 is a perspective view illustrating a part of the condensing sheet shown in FIG. 2.

FIG. 3 is a perspective view illustrating a part of the condensing sheet 115 shown in FIG. 2.

Referring to FIG. 3, the condensing sheet 115 includes the base film 6, the condensation patterns 2 formed on the base film 6, and the flat surfaces 4 arranged between the condensation patterns 2 and spaced a certain distance from each other.

The base film 6 is formed of a material such as polyethylene terephthalate (PET), polymethylmethacrylate (PMMA) and polycarbonate (PC). The light emitted from the light guide plate 130 is incident upon the rear surface of the base film 6. The light incident upon the rear surface of the base film 6 is refracted at the rear surface of the base film 6 and supplied to the condensation patterns 2 or the flat surfaces 4.

The condensation patterns 2 are arranged on the base film 6. The condensation patterns 2 refract the light incident upon the rear surface of the base film 6 in a direction perpendicular to the liquid crystal panel 164. To this end, a peak 2a and valley 2b of each condensation pattern 2 are arranged in the longitudinal direction of the base film 6. Herein, the longitudinal direction of the base film 6 is identical to the longitudinal direction of the liquid crystal panel 164. Accordingly, the peak 2a and valley 2b of each condensation pattern 2 are arranged in the longitudinal direction of the liquid crystal panel 164.

The flat surfaces 4 are arranged between the condensation patterns 2 and spaced a certain distance from each other. Accordingly, the flat surfaces 4 are arranged in the longitudinal direction of the base film 6, similar to the condensation patterns 2. The flat surfaces 4 enhance straightness of the light incident upon the rear surface of the base film 6, thereby reducing side lobes and enhancing the luminance at the viewing angle.

Figure 4:
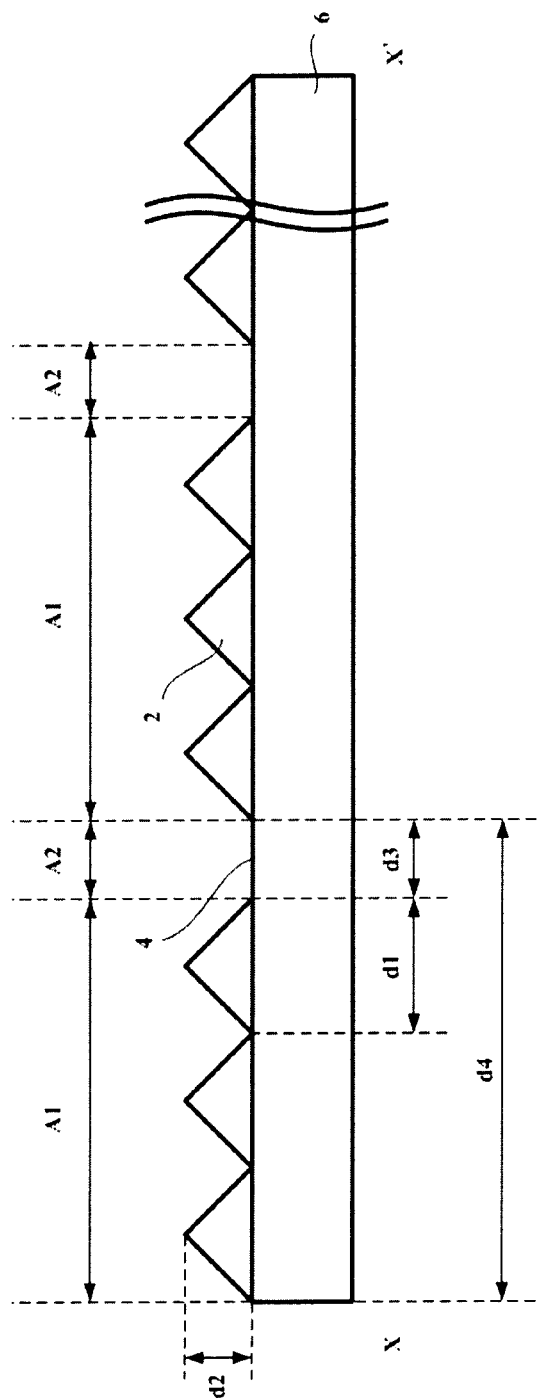
FIG. 4 is a cross-sectional view of the condensing sheet shown in FIG. 3, taken along line X-X'.
Figure 5:
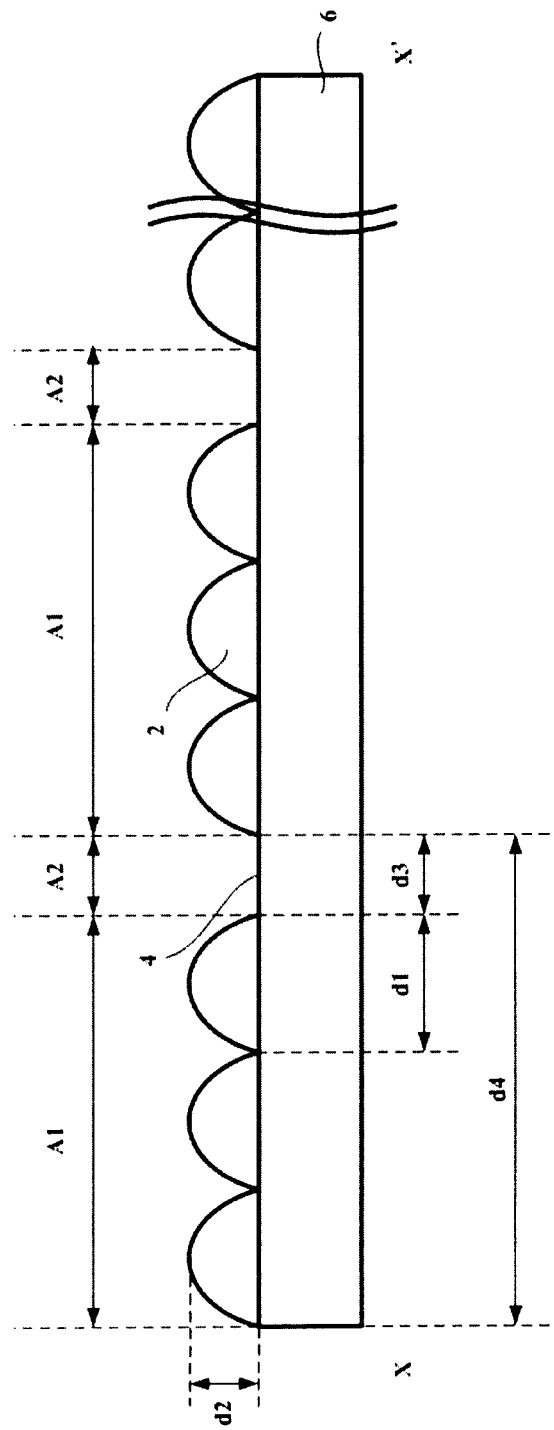
FIG. 5 is a cross-sectional view illustrating a condensing sheet according to another embodiment of the present invention.

FIG. 4 is a cross-sectional view of the condensing sheet 115 shown in FIG. 3, taken along X-X', and FIG. 5 is a cross-sectional view illustrating a condensing sheet 115 according to another embodiment of the present invention.

Referring to FIG. 4, the upper surface of the base film 6 is divided into a first area A1 in which the condensation patterns 2 are formed, and a second area A2 in which the flat surface 4 is formed. Herein, the first and second areas A1 and A2 are alternately defined on the upper surface.

Specifically, at least two condensation patterns 2 are arranged in each first area A1. Each of the condensation patterns 2 may have a triangular cross section provided with a first inclined surface and a second inclined surface. Alternatively, each of the condensation patterns 2 may have a semi-circular cross section as shown in FIG. 5.

The flat surface 4 is formed in the second area A2. Since the second area A2 and the first area A1 are alternately defined, the flat surfaces 4 are arranged between the condensation patterns 2 and spaced a certain distance from each other.

To prevent visible defects in the condensation patterns 2 and the flat surface 4, the condensing sheet 115 is designed as follows.

The width d1 of each condensation pattern 2 is designed to be greater than 20 μm and less than 80 μm. In addition, the height d2 of each condensation pattern 2 is designed to be greater than 8 μm and less than 45 μm.

The width d3 of each flat surface 4 is designed to be greater than 1 μm, and the width 1 of each condensation pattern 2 is designed to be greater than the width d3 of each flat surface 4.

As discussed above, the flat surface 4 functions to enhance straightness of the light incident upon the rear surface of the base film 6, to reduce side lobes, and to enhance the luminance at the viewing angle. To this end, the length d4 of a combination of neighboring first and second areas A1 and A2 needs to be less than 20 mm. That is, the length d4 of a combination of the width of the first area A1 and the width of the neighboring second area A2 (i.e., the width of the flat surface) should be ≤20 mm.

Figure 6:
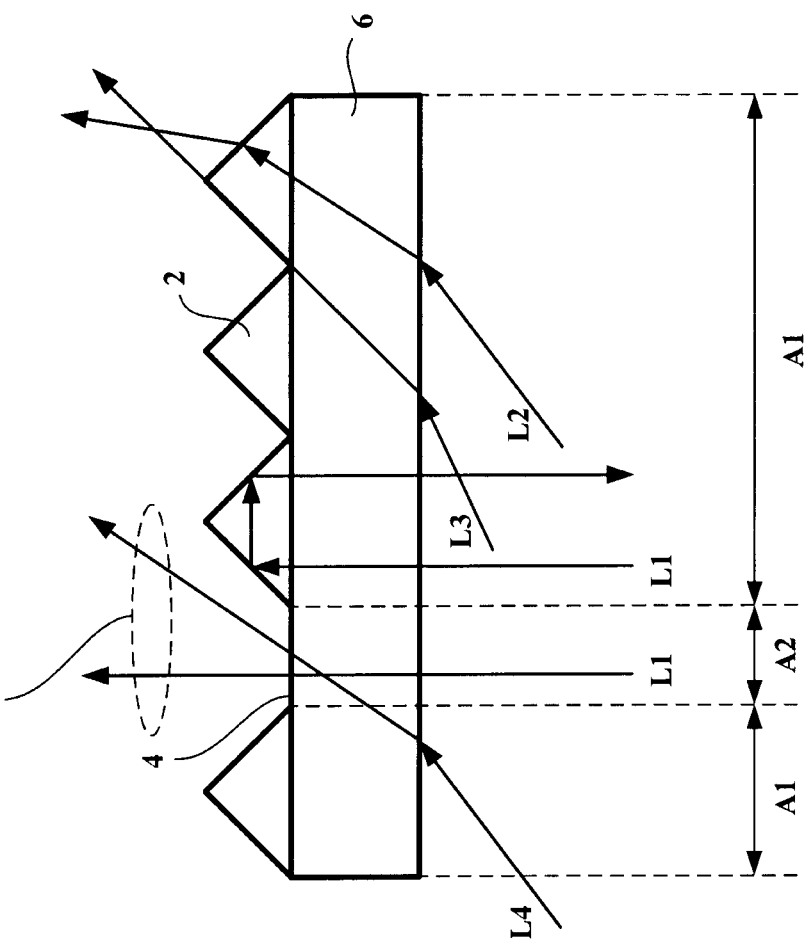
FIG. 6 is a view schematically illustrating the path of light incident upon the condensing sheet shown in FIG. 4.

FIG. 6 is a view illustrating the path of light incident upon the condensing sheet shown in FIG. 4. Hereinafter, a detailed description will be given of the path of the light incident upon the condensing sheet 115 with reference to FIG. 6.

In the first area A1 having multiple condensation patterns 2, the perpendicular light L1 perpendicularly incident upon the rear surface of the base film 6 sequentially undergoes total reflection on the first inclined surfaces and second inclined surfaces of the condensation patterns 2, and is then recycled. In addition, the inclined light L2 inclinedly incident upon the rear surface of the base film 6 is refracted at the first inclined surfaces or second inclined surfaces of the condensation patterns 2 and collected at the liquid crystal panel 164 in a perpendicular direction. In addition, a portion L3 of the inclined light L2 incident upon the rear surface of the base film 6 travels along the first inclined surfaces or second inclined surfaces of the condensation patterns 2 and leaves the base film 6 without being refracted.

Accordingly, in FIG. 4 in the first area A1 where multiple condensation patterns 2 are arranged, the portion of the perpendicularly transmitted light is greater than the portion of the inclinedly transmitted light. The inclinedly transmitted light has a relatively high luminance at the front but a relatively low luminance at the viewing angle.

In the second area A2 where the flat surface 4 is formed, the perpendicular light L1 perpendicularly incident upon the rear surface of the base film 6 is transmitted through the base film 6. In addition, the inclined light L4 inclinedly incident upon the base film 6 is refracted by a predetermined angle at the upper surface of the base film 6 and leaves the base film at the initial incident angle. Thereby, side lobes are reduced in the second area A2 where the flat surface 4 is formed.

For reference, in the case of a common backlight unit, the portion of the inclined lights L2, L3 and L4 of the light incident upon the rear surface of the condensing sheet 115 is greater than the portion of the perpendicular light L1. Accordingly, in the second area A2 where the flat surface 4 is formed, the portion of the light transmitted at an inclination angle through the second area A2 is greater than the portion of the light perpendicularly transmitted through the second area A2. The inclinedly transmitted light has a relatively low luminance at the front but a relatively high luminance at the viewing angle.

As the first area A1 provided with the multiple condensation patterns 2 and the second area A2 provided with the flat surface 4 are alternately defined on the upper surface of the base film 6, side lobes occurring in the first area A1 are reduced and the luminance at the viewing angle is increased in the second area A2. Thereby, the uniformity of the light transmitted through the condensing sheet 115 may be enhanced.

In addition, the contrast ratio is defined as the ratio of the luminance of the white color to that of the black color. The condensing sheet 115 may enhance the contrast ratio at the viewing angle by increasing the luminance at the viewing angle, i.e., the luminance of the white color at the viewing angle.

Figure 7B:
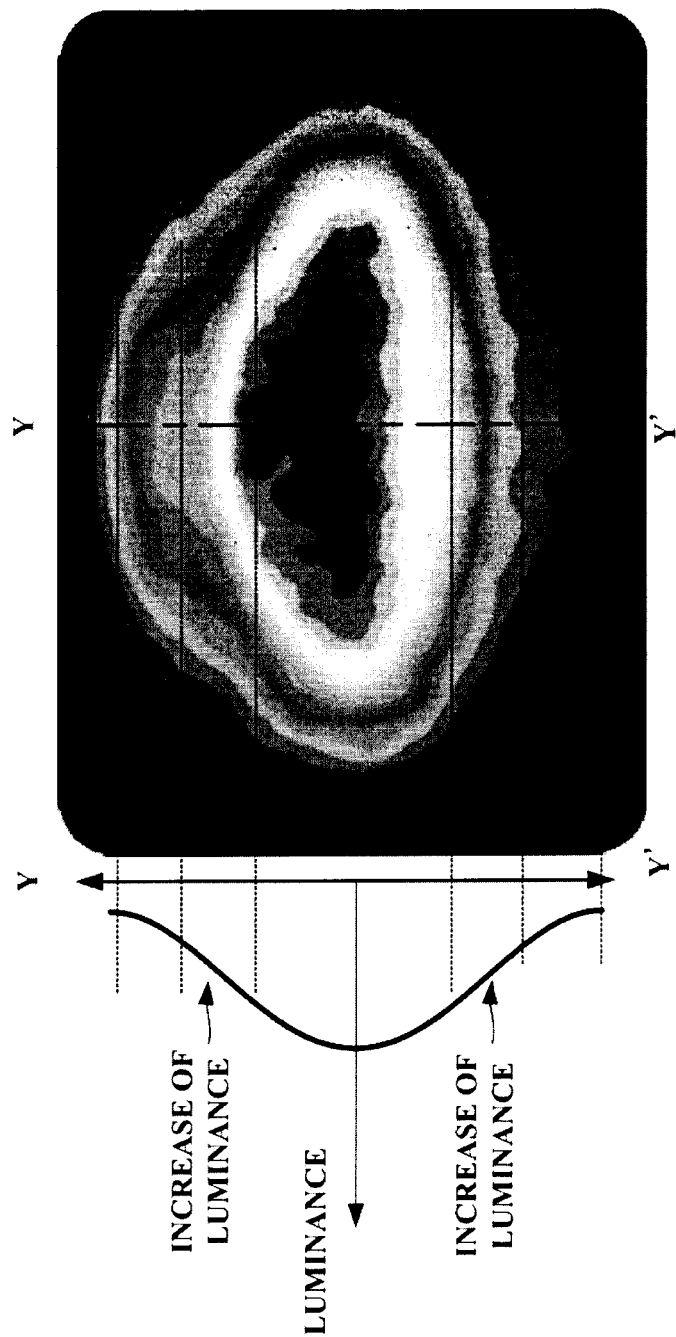
FIG. 7B is a view illustrating results of simulations demonstrating the effects of the present invention.

FIG. 7A shows an image of distribution of the luminance on the front surface of a backlight unit of the related art. FIG. 7B shows an image of distribution of the luminance on the front surface of a backlight unit according to the present invention. FIG. 7C shows a graph comparing the curves of luminance distribution shown in FIGS. 7A and 7B.

Referring to FIG. 7A, in the case of the backlight unit of the related art, the red and yellow regions representing high luminance are distributed in the central area, and the sky-blue region representing intermediate luminance is arranged at the upper and lower sides of the backlight unit. The blue region representing low luminance is arranged in the intermediate area between the central area and the upper and lower sides. The backlight unit of the related art shows non-uniform distribution of luminance from the central area to the peripheral area due to side lobes in the condensing sheet, and undergoes degradation of luminance in the intermediate area.

In the case of the backlight unit according to an embodiment of the present invention, luminance is uniformed distributed form the central area to the outer area, as shown in FIG. 7B. That is, as shown in FIG. 7C, compared to the backlight unit of the related art, the backlight unit according to this embodiment reduces difference in luminance between the central portion and the outer area. Particularly, according to this embodiment, luminance in the intermediate area between the central area and the upper and lower outer areas increases, and therefore the luminance at the viewing angle indicating the angle at which the liquid crystal panel is viewed along the longitudinal direction thereof, i.e., at the left and right viewing angles increases. Thereby, contrast ratio may be enhanced at the left and right viewing angles, and thereby the quality of an image at the viewing angles maybe improved.

As such, a condensing sheet, a backlight unit, and a liquid crystal display device using the same according to embodiments of the present invention may reduce side lobes and increase luminance at left and right viewing angles, thereby enhancing contrast ratio at the viewing angles. Therefore, the backlight unit using the condensing sheet according to the embodiments of the present invention may be easily applicable to a display device requiring high contrast ration at the left and right viewing angles such as, for example, a display device disposed between a driver's seat and a front passenger seat.

Meanwhile, the condensing sheet 115 according to embodiments of the present invention, which may improve luminance at the viewing angle by alternately forming condensation patterns and flat surfaces on the base film, may maximize enhancement of the contrast ration by being designed as follows.

Figure 8:
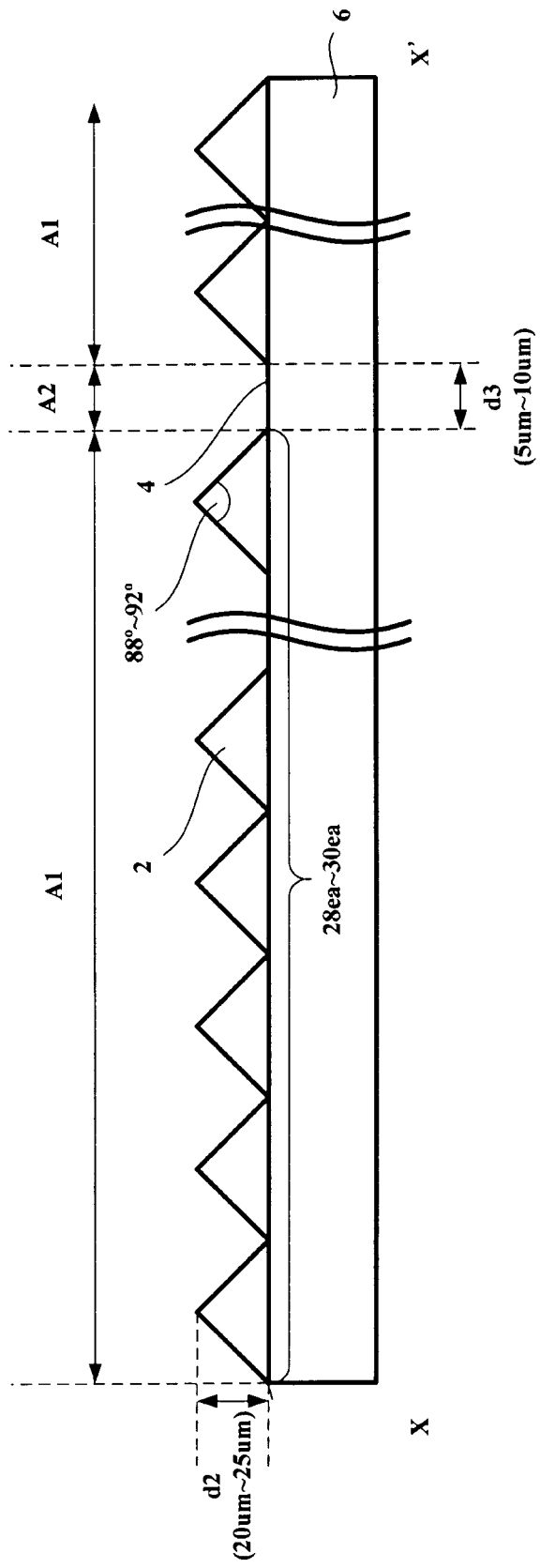
FIG. 8 is a cross-sectional view illustrating a condensing sheet according to one embodiment of the present invention.

FIG. 8 is a cross-sectional view illustrating the condensing sheet 115 according to on embodiment of the present invention. FIG. 9 is experimental data obtained by measuring a contrast ratio at each viewing angle according to an embodiment of the present invention.

Referring to FIG. 8, the condensing sheet 115 may be optimized as follows:

First, each of the first areas A1 is provided with 28 to 30 condensation patterns 2.

The height d2 of the condensation patterns 2 is designed to be between 20 μm and 25 μm.

In addition, the cross section of the peak of each condensation pattern 2 is designed to have an angle between 88° and 92°.

The width d3 of the flat surface 4 provided in each second area A2 is designed to be between 5 μm and 10 μm.

By forming 30 condensation patterns 2 in the first area A1 of the condensing sheet 115, designing the height d2 of each condensation pattern 2 to be 25 μm, designing the angle of the cross section of the peak of each condensation pattern 2 to be 92°, and designing the width d3 of the flat surface 4 provided in each second area A2 to be 5 μm, the contrast ratio at the viewing angles may be maximized. The experimental result is discussed below.

Figure 9A:
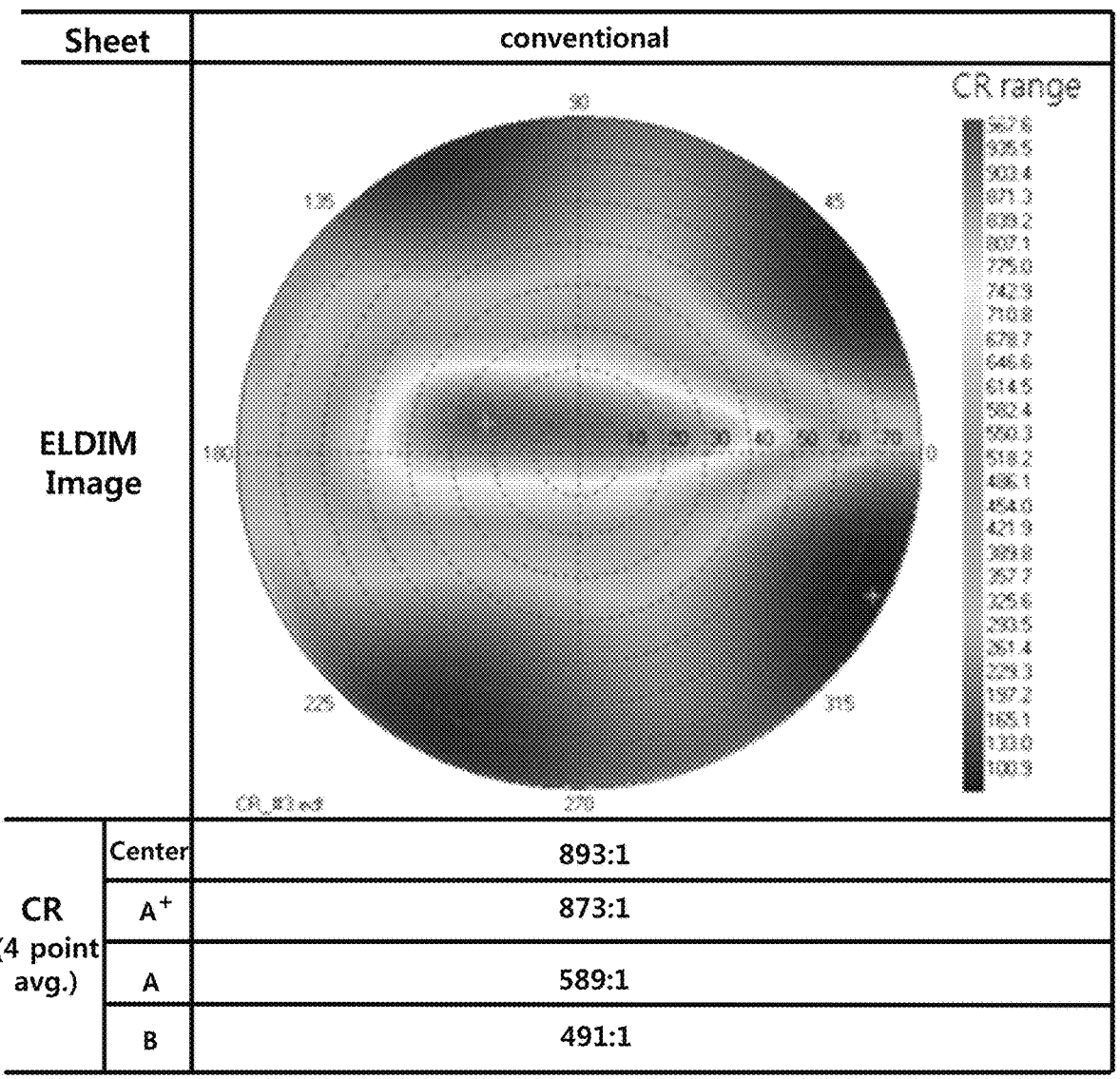
FIGS. 9A to 9C are experimental data obtained by measuring a contrast ratio at each viewing angle according to one embodiment of the present invention.
Figure 9B:
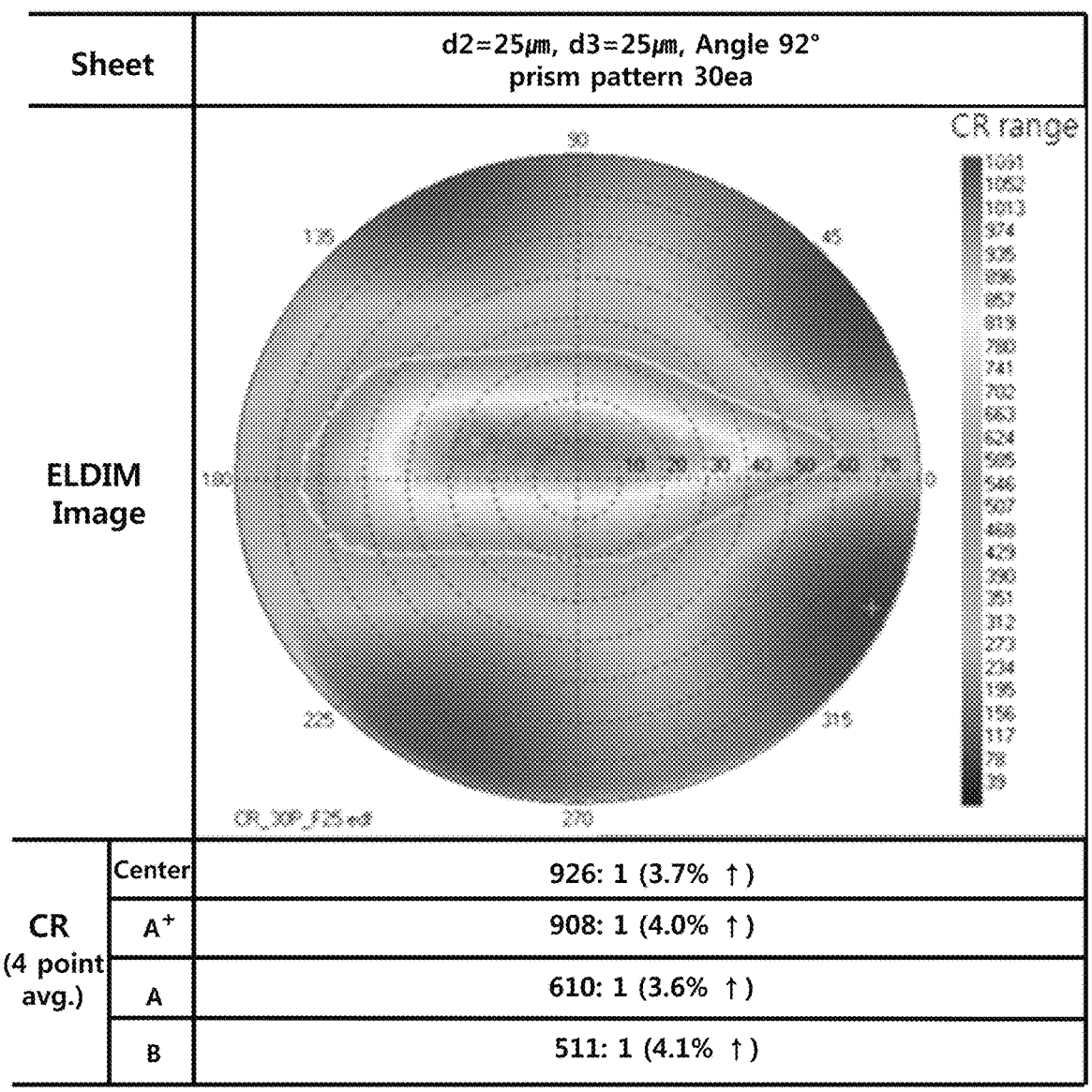
Figure 9C:
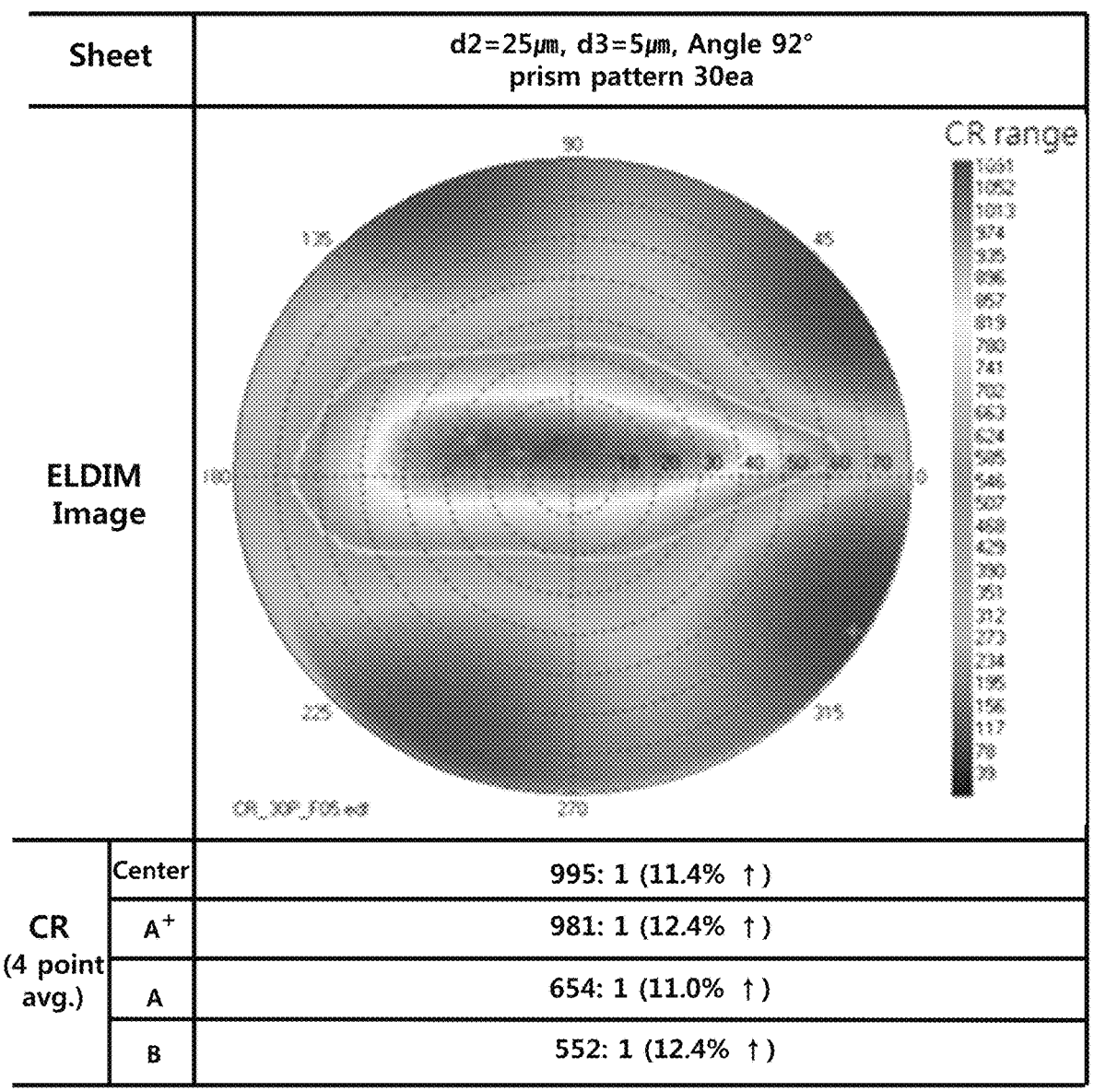

FIGS. 9A, 9B and 9C shows contrast ratios of the prism sheets according to the conventional art and the present invention. The experimental data includes the contrast ratios measured at the centers of the sheets and the contrast ratios measured in the first to third areas, A+, A and B.

The first area A+ is the area of viewing angle when the center is seen at laterally inclined angles of +/−10°, an upwardly inclined angle of 8°, and a downwardly inclined angle of 4°.

The second area A is the area of viewing angle when the center is seen at laterally inclined angles of +/−40°, an upwardly inclined angle of 20°, and a downwardly inclined angle of 10°.

The third area B is the area of viewing angle when the center is seen at laterally inclined angles of +/−50°, an upwardly inclined angle of 20°, and a downwardly inclined angle of 10°.

For reference, the contrast ratio data is an average value of contrast ratios measured at four outermost points of each of the areas (i.e., the center, A+, A, and B).

Referring to FIGS. 9A, 9B and 9C, it can be seen that the contrast measured at the center and the contrast ratios measured at the first to third areas A+, A, and B are improved by simply alternately forming condensation patterns and flat surfaces on the base film of the condensing sheet 115 according to an embodiment of the present invention, compared to the conventional case.

In case 1 (FIG. 9B), which is not optimized, the contrast ratios at the center, and areas A+, A, and B have increased only by 4% from those of the conventional case.

By forming 30 condensation patterns 2 in each of the first areas A1 of the condensing sheet 115, designing the height d2 of each condensation pattern 2 to be 25 μm, designing the angle of the cross section of the peak of each condensation pattern 2 to be 92°, and designing the width d3 of the flat surface 4 provided in each second area A2 to be 5 μm, the contrast ratios at the center, and areas A+, A, and B my increase by about 11% to 12% from those of the conventional art, as shown in case 2 (FIG. 9C).

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A condensing sheet, comprising:
    a base film having a rear surface and an upper surface, wherein light is incident on the rear surface, and wherein light incident at an angle on the rear surface is refracted at the rear surface; and
    a plurality of condensation patterns on the upper surface of the base film, the plurality of condensation patterns further refracting the light incident on the rear surface of the base film,
    wherein a first area and a second area are alternately defined on the upper surface of the base film, and wherein at least two adjoining condensation patterns refracting the light incident on the rear surface of the base film are arranged in the first area, and a flat surface for enhancing straightness of the light incident on the rear surface of the base film is formed in the second area, and wherein a width of the flat surface is 5 μm, a height of each of the condensation patterns is 25 μm, a cross section of each of the condensation patterns has a triangular shape having an angle 92° with respect to the base film, and the first area contains 30 condensation patterns.

2. The condensing sheet of claim 1, wherein a width of each of the condensation patterns is greater than a width of the flat surface.

3. The condensing sheet according to claim 1, wherein a length of a combination of a width of the first area and a width of a neighboring second area is less than 20 mm.

4. The condensing sheet according to claim 1, wherein a width of each of the condensation patterns is greater than 20 μm and less than 80 μm.

5. The condensing sheet according to claim 1, wherein a peak and a valley of each of the condensation patterns are arranged in a longitudinal direction of the base film.

6. A backlight unit, comprising:
at least one diffusion sheet; and
at least one condensing sheet,
wherein the condensing sheet includes:
a base film having a rear surface and a upper surface, wherein light is incident on the rear surface, and wherein light incident at an angle on the rear surface is refracted at the rear surface; and
a plurality of condensation patterns on the upper surface of the base film, the plurality of condensation patterns further refracting the light incident on the rear surface of the base film,
wherein a first area and a second area are alternately defined on the upper surface of the base film, and wherein at least two adjoining condensation patterns refracting the light incident on the rear surface of the base film are arranged in the first area and a flat surface for enhancing straightness of the light incident on the rear surface of the base film is formed in the second area, and wherein a width of the flat surface is 5 μm, a height of each of the condensation patterns is 25 μm, a cross section of each of the condensation patterns has a triangular shape having an angle 92° with respect to the base film, and the first area contains 30 condensation patterns,
at least one light guide plate; and
at least one reflection sheet.

7. The backlight unit of claim 6, wherein a width of each of the condensation patterns is greater than a width of the flat surface.

8. The backlight unit according to claim 6, wherein a length of a combination of a width of the first area and a width of a neighboring second area is less than 20 mm.

9. The backlight unit according to claim 6, wherein a width of each of the condensation patterns is greater than 20 μm and less than 80 μm.

10. The backlight unit according to claim 6, wherein a peak and a valley of each of the condensation patterns are arranged in a longitudinal direction of the base film.

11. The backlight unit according to claim 6, wherein a cross section of each of the condensation patterns has a triangular shape.

12. A liquid crystal display device, comprising:
a liquid crystal panel to display an image; and
a backlight unit to supply light to the liquid crystal panel;
wherein the backlight unit comprises:
at least one diffusion sheet; and
at least one condensing sheet,
wherein the condensing sheet includes:
a base film having a rear surface and a upper surface, wherein light is incident on the rear surface, and wherein light incident at an angle on the rear surface is refracted at the rear surface, and
a plurality of condensation patterns on the upper surface of the base film, the plurality of condensation patterns further refracting the light incident on the rear surface of the base film,
wherein a first area and a second area are alternately defined on the upper surface of the base film, and wherein at least two adjoining condensation patterns refracting the light incident on the rear surface of the base film are arranged in the first area and a flat surface for enhancing straightness of the light incident on the rear surface of the base film is formed in the second area, and
wherein a width of the flat surface is 5 μm, a height of each of the condensation patterns is 25 μm, a cross section of each of the condensation patterns has a triangular shape having an angle 92° with respect to the base film, and the first area contains 30 condensation patterns.

13. The liquid crystal display device according to claim 12, wherein a length of a combination of a width of the first area and a width of a neighboring second area is less than 20 mm.

14. The liquid crystal display device according to claim 12, wherein a width of each of the condensation patterns is greater than 20 μm less than 80 μm.

15. The liquid crystal display device according to claim 12, wherein a peak and a valley of each of the condensation patterns are arranged in a longitudinal direction of the base film.

16. The liquid crystal display device according to claim 12, wherein a width of each of the condensation patterns is greater than a width of the flat surface.

* * * * *